United States Patent
Hashidate (10) Patent No.: US 7,263,120 B2
(45) Date of Patent: Aug. 28, 2007

(54) SEMICONDUCTOR DEVICE TO REDUCE POWER INDIVIDUALLY TO EACH CIRCUIT

(75) Inventor: Shuichi Hashidate, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 683 days.

(21) Appl. No.: 10/392,845

(22) Filed: Mar. 21, 2003

(65) Prior Publication Data

US 2004/0043734 A1    Mar. 4, 2004

(30) Foreign Application Priority Data

Aug. 27, 2002    (JP) .............................. 2002-246565

(51) Int. Cl.
*H04B 1/38*    (2006.01)

(52) U.S. Cl. ..................................... 375/219

(58) Field of Classification Search ................ 375/259, 375/295, 316, 354, 377, 356, 219, 224; 340/5.63, 340/5.6, 5.61, 5.2, 5.1, 825, 425.2, 425.1; 370/310; 455/574, 572, 550.1, 73, 127.1, 455/127.5, 91
See application file for complete search history.

(56) References Cited

U.S. PATENT DOCUMENTS 5,628,020 A    5/1997    O'Brien 5,842,141 A    * 11/1998    Vaihoja et al. .............. 455/574

FOREIGN PATENT DOCUMENTS

| JP | 4348410 | 12/1992 |
|---|---|---|
| JP | 05-150870 | 6/1993 |
| JP | 05-071917 | 9/1993 |
| JP | 7020964 | 1/1995 |
| JP | 07-038776 | 2/1995 |
| JP | 7-200093 | 8/1995 |
| JP | 8107401 | 4/1996 |
| JP | 08-234861 | 9/1996 |

* cited by examiner

*Primary Examiner*—Pankaj Kumar
(74) *Attorney, Agent, or Firm*—Volentine & Whitt, P.L.L.C.

(57) ABSTRACT

A semiconductor device capable of reducing power consumption. In the semiconductor device having a plurality of data transmitter-receiver circuits using clock signals on frequencies prescribed in the unified standard as transmit/receive clock signals, an oscillator circuit and a clock generator circuit are provided for each data transmitter-receiver circuit and a supply of clock signals to the data transmitter-receiver circuits can be stopped by shutting off the power supply to the oscillator circuits and the clock generator circuits inside the plurality of data transmitter-receiver circuits individually with respect to each data transmitter-receiver circuit.

22 Claims, 12 Drawing Sheets

SEMICONDUCTOR DEVICE TO REDUCE POWER INDIVIDUALLY TO EACH CIRCUIT

BACKGROUND OF THE INVENTION

1. Field of the Invention

The present invention relates to a circuitry and a clock control method preferable for a semiconductor device having serial transmission/reception means (USB control circuit) for downloading or uploading data at a certain transmit-receive frequency from a personal computer (PC) such as a digital audio and an interface (IF) circuit for performing serial transmission/reception of data, which has been processed in a digital signal processing circuit (DSP circuit) performing a data decompression process or the like, at a certain transmit-receive frequency.

2. Related Background Art

In recent years, demand for digital audio players or other portable devices as peripherals is bulging. This type of peripheral serves as a micro controller unit (MCU) to be a main control unit, a flash memory controller for writing or reading audio data stored in an external memory, a DSP circuit for decoding or decrypting the data read from the external memory, an interface circuit (SAI circuit: Serial audio interface) outputting the data processed in the DSP circuit as audio signals to an ADC/DAC system, and a USB controller connected to a PC for downloading or uploading data to an external memory such as a flash memory.

This type of peripheral performs reproduction of music data, copyright protection, downloading, and displaying. The DSP circuit performs data decoding, data outputting, and an equalizer/volume control in the reproduction of music data.

The peripheral is portable and therefore driven by a battery. Accordingly, the peripheral facilities need be contained in a single chip to reduce a battery drain so as to hold down the power consumption.

The multifunction and the high-speed operating frequency of the DSP circuit mentioned above, however, are indispensable for achieving a high performance of a digital audio player. Accordingly, an increase in a gate size due to the provision of the multifunction and an increase in speed of the operating frequency boost consumed current.

A clock generator circuit for audio clock signals for outputting the data decoded in the DSP circuit to the DAC system outside the chip has frequencies determined exclusively for the clock generator circuit so as to adapt to MPEG1, LAYER3, MPEG2, LAYER3, and MPEG2.5. Since the USB circuit performs 12-MHz serial communication, its internal control circuit requires 48-MHz fixed clock signals. Therefore, at least two clock systems are required and it leads to an increase in current consumed by a PLL or an oscillator circuit (OSC).

Therefore, further reduction of power consumption is required as the whole peripheral device (the entire digital audio player). Particularly during music data reproduction with the DSP circuit, a battery drain is drastic since the DSP circuit operates at an extremely high frequency. Therefore, there has been a demand for a semiconductor device improved in the power consumption.

SUMMARY OF THE INVENTION

It is an object of the present invention to provide a semiconductor device capable of reducing the power consumption. In accordance with an aspect of the present invention, there is provided a semiconductor device having a plurality of data transmitter-receiver circuits using clock signals on frequencies prescribed in the unified standard as transmit/receive clock signals, wherein an oscillator circuit and a clock generator circuit are provided for each data transmitter-receiver circuit and wherein a supply of clock signals to the data transmitter-receiver circuits can be stopped by shutting off the power supply to the oscillator circuits and the clock generator circuits inside the plurality of data transmitter-receiver circuits individually with respect to each data transmitter-receiver circuit.

BRIEF DESCRIPTION OF THE DRAWINGS

These and other features, aspects, and advantages of the present invention will become better understood with regard to the following description, appended claims, and accompanying drawings where;

DETAILED DESCRIPTION OF THE PREFERRED EMBODIMENTS

The preferred embodiments of the present invention will now be described in detail hereinafter with reference to the accompanying drawings.

First Embodiment

Figure 1:
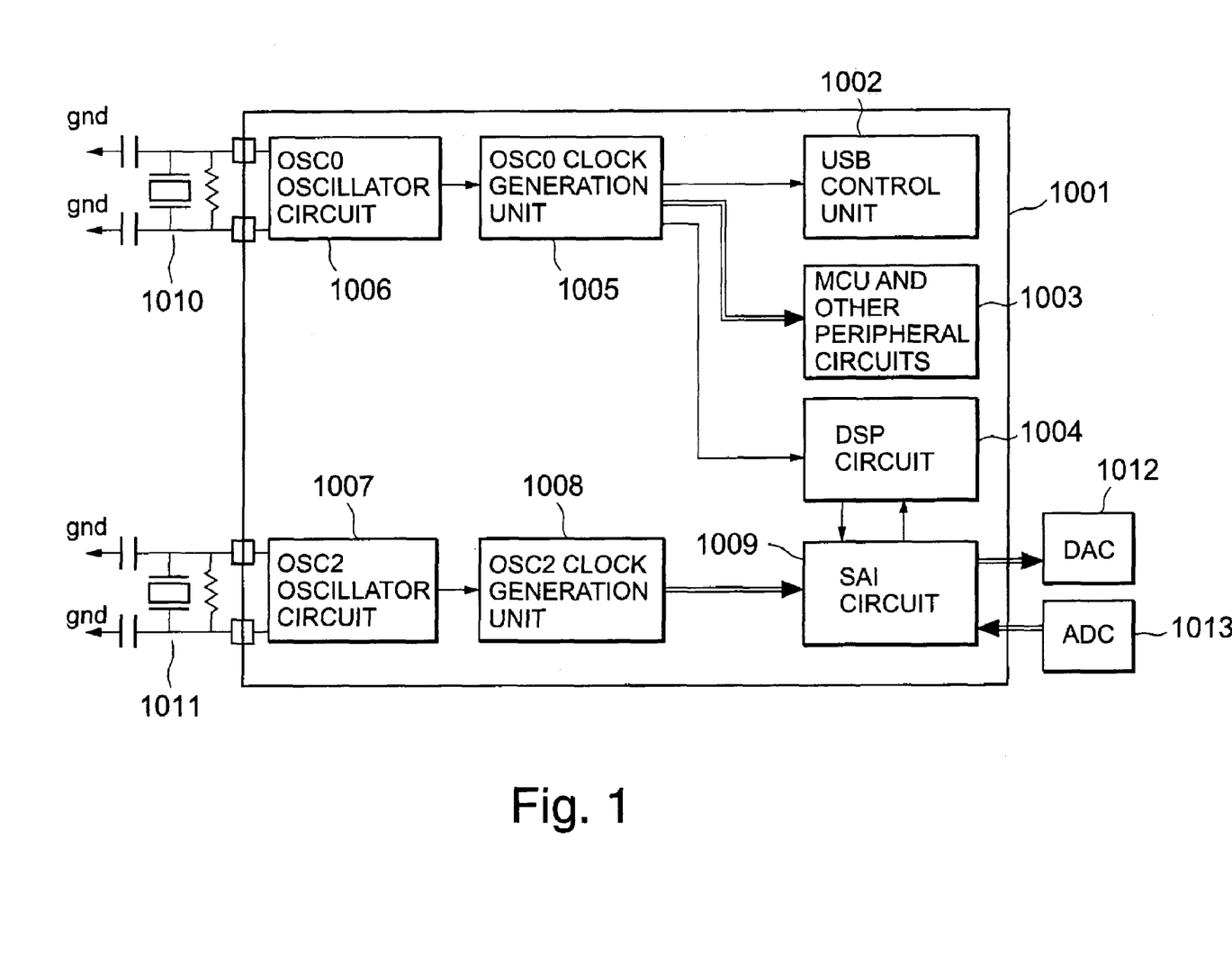
FIG. 1 is an outline view of a semiconductor device in a first embodiment of the present invention.

Referring to FIG. 1, there is shown an outline view of a semiconductor device 1001 in a first embodiment of the present invention. The semiconductor device mainly comprises a USB control unit 1002 for downloading or uploading data from a PC, a clock generation unit (1005 to 1008) for generating clock signals, a DSP circuit 1004, a peripheral circuit 1003 such as an external memory interface circuit including a main control unit (MCU), and a serial interface circuit (SAI circuit) 1009 for inputting or outputting data processed by the DSP circuit to a DAC (1012) or ADC (1013) system outside a chip.

The semiconductor device controls their operations using the MCU circuit; for example, in a music reproducing operation, data input from the external memory interface circuit included in the MCU and other peripheral circuits 1003 is transferred to the DSP circuit 1004 under the control of the MCU circuit, the data is processed in the DSP circuit at a high speed, and then it is output from the SAI circuit 1009 to the external DAC system 1012.

The DSP circuit 1004 is required to perform very fast operations and therefore a transistor having a lower threshold is generated only for the DSP circuit 1004 to achieve the fast operations.

Two systems of clock generator circuits are provided; they are classified into an OSC0 clock generation unit for the main clock (1005 and 1006) and an OSC2 clock generation unit for the audio clock (1007 and 1008). When these clock generation units are used, they are connected outside to oscillators 1010 and 1011, respectively, or clock signals are input directly.

Figure 2:
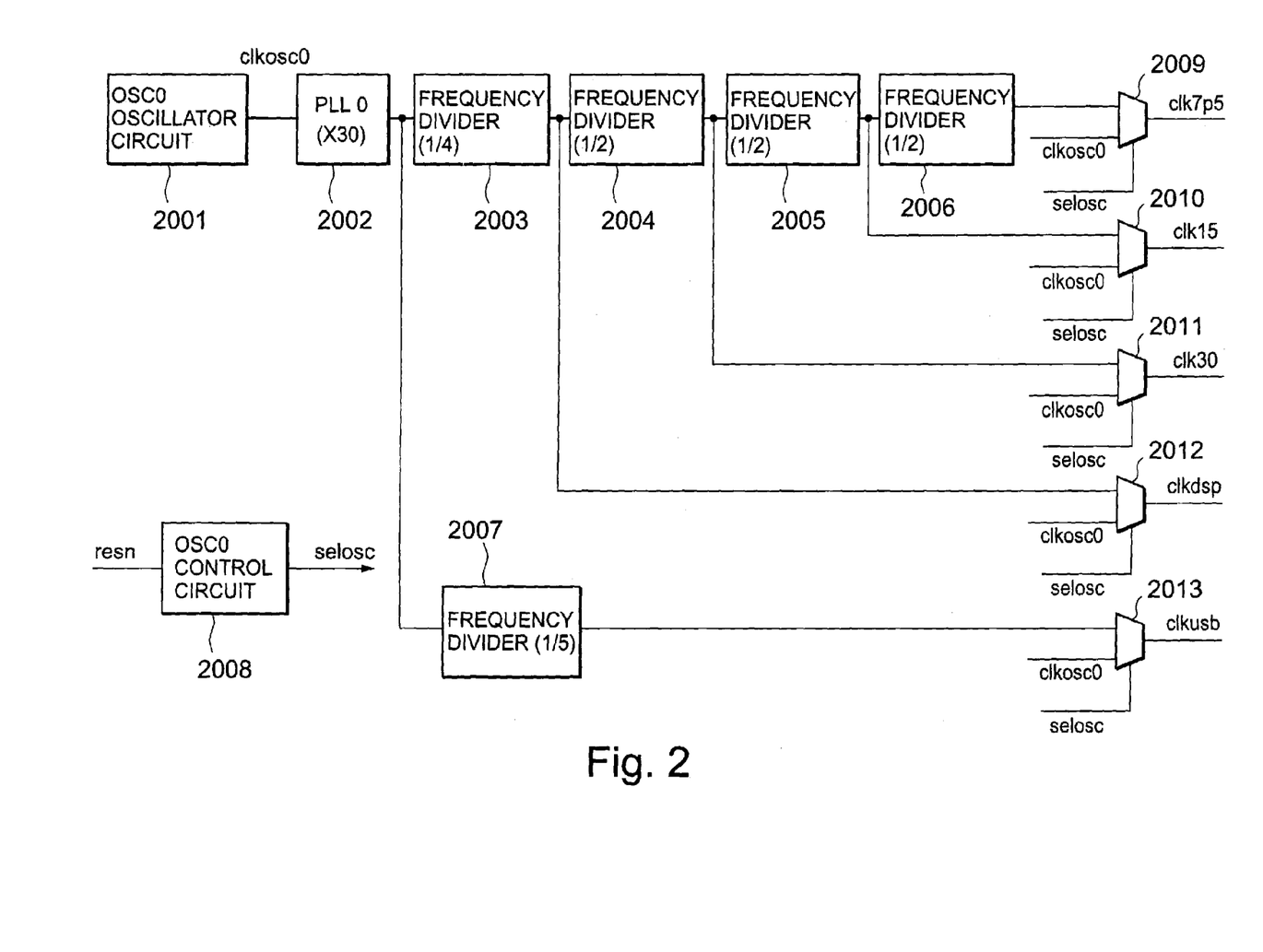
FIG. 2 is a diagram showing a configuration of an OSC0 clock generation unit.

Referring to FIG. 2, there is shown a configuration of the OSC0 clock generation unit. The OSC0 clock generation unit comprises an OSC0 oscillator circuit 2001, a PLL0 (2002), frequency divider circuits (2003 to 2007), and an OSC0 clock control circuit 2008. A clock signal (clockocs0: 8 MHz) output from the OSC0 oscillator circuit 2001 is connected to an input of the PLL0 (2002) to be multiplied by 30. The frequency divider circuits generate clock signals of 60 MHz, 30 MHz, 15 MHz, 7.5 MHz, and 48 MHz from the 240-MHz clock signal resulting from the multiplication by 30.

The generated clock signals are used in the DSP circuit (60 MHz), the USB control unit (48 MHz), and the MCU and other peripheral circuits (30 MHz, 15 MHz, and 7.5 MHz). The OSC0 oscillator circuit 2001 and the PLL0 (2002) always need be operating in the normal operation since they are generating clock signals supplied to the MCU circuit. They are stopped only in the stop mode of the entire chip.

The OSC2 clock generation unit (See FIG. 3) comprises an OSC2 oscillator circuit 3001, PLL2 (3002 and 3003), frequency divider circuits (3004 to 3007), and an OSC2 clock control circuit 3008. A clock signal (clockosc2: 16.9344 MHz or 11.2896 MHz) input from the OSC2 clock input terminal is used in the SAI circuit 1009 directly at a master clock frequency or a frequency is selected out of a plurality of frequencies generated through the PLL2 (3002 and 3003) and the frequency divider circuits (3004 to 3007) before using the clock signal. Regarding the output frequencies, clock signals of 18.432 MHz and 12.288 MHz are generated by using an oscillator whose master clock frequency is 16.9344 MHz. Furthermore, clock signals of 12.288 MHz and 8.192 MHz are generated by using an oscillator whose master clock frequency is 11.2896 MHz.

Figure 3:
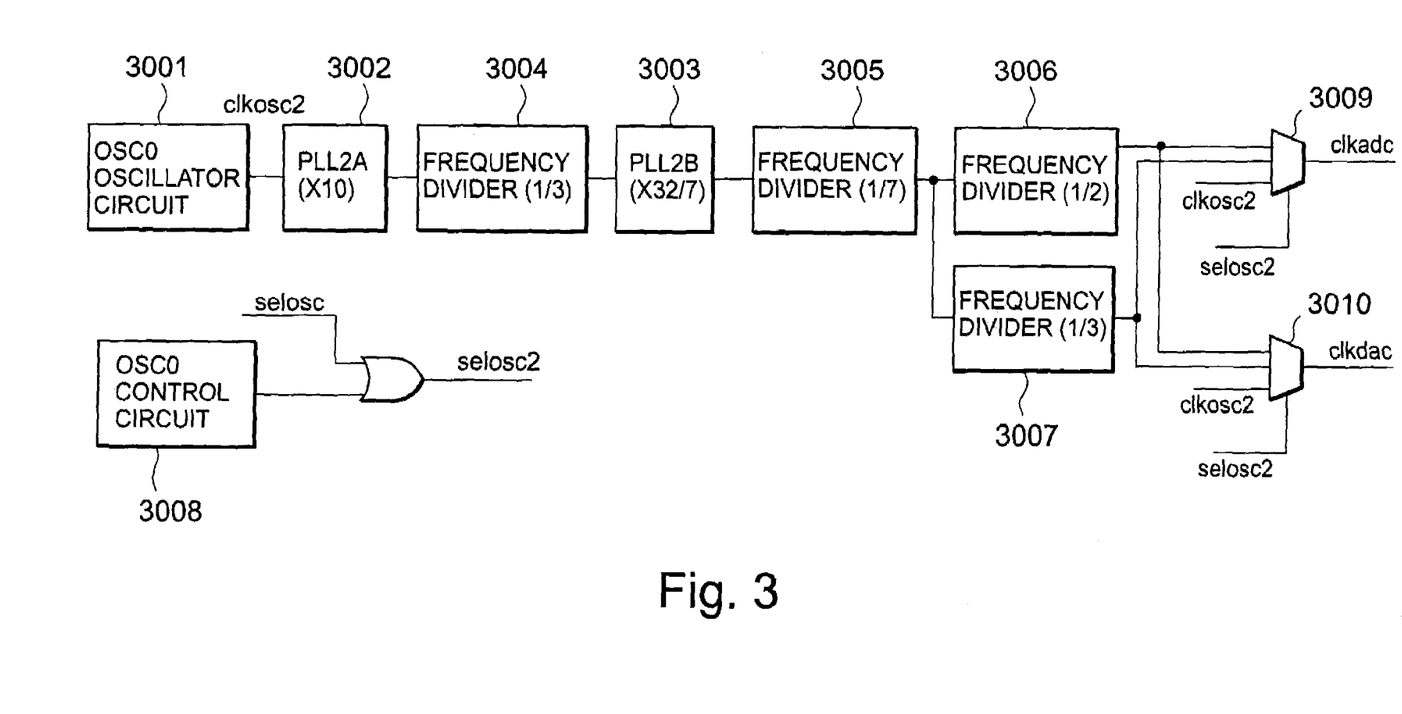
FIG. 3 is a diagram showing a configuration of an OSC2 clock generation unit.

Although two PLLs are used for the OSC2 clock generation unit in this embodiment, it is also possible to use only one PLL. Generated clock signals are used as clock signals for the SAI circuit 1009 and the external ADC/DAC 1012 and 1013 systems.

In this manner, the circuits including the oscillator circuit of the OSC0 clock generation units for the main clock (1005 and 1006) are separated from those of the OSC2 clock generation units for the audio clock (1007 and 1008), thereby enabling power down of the OSC2 oscillator circuit 3001, the OSC2 PLL2 (3002 and 3003), and their peripheral frequency divider circuits (3004 to 3007) when the audio clock is not used temporarily, and therefore consumed current is remarkably reduced.

Figure 4:
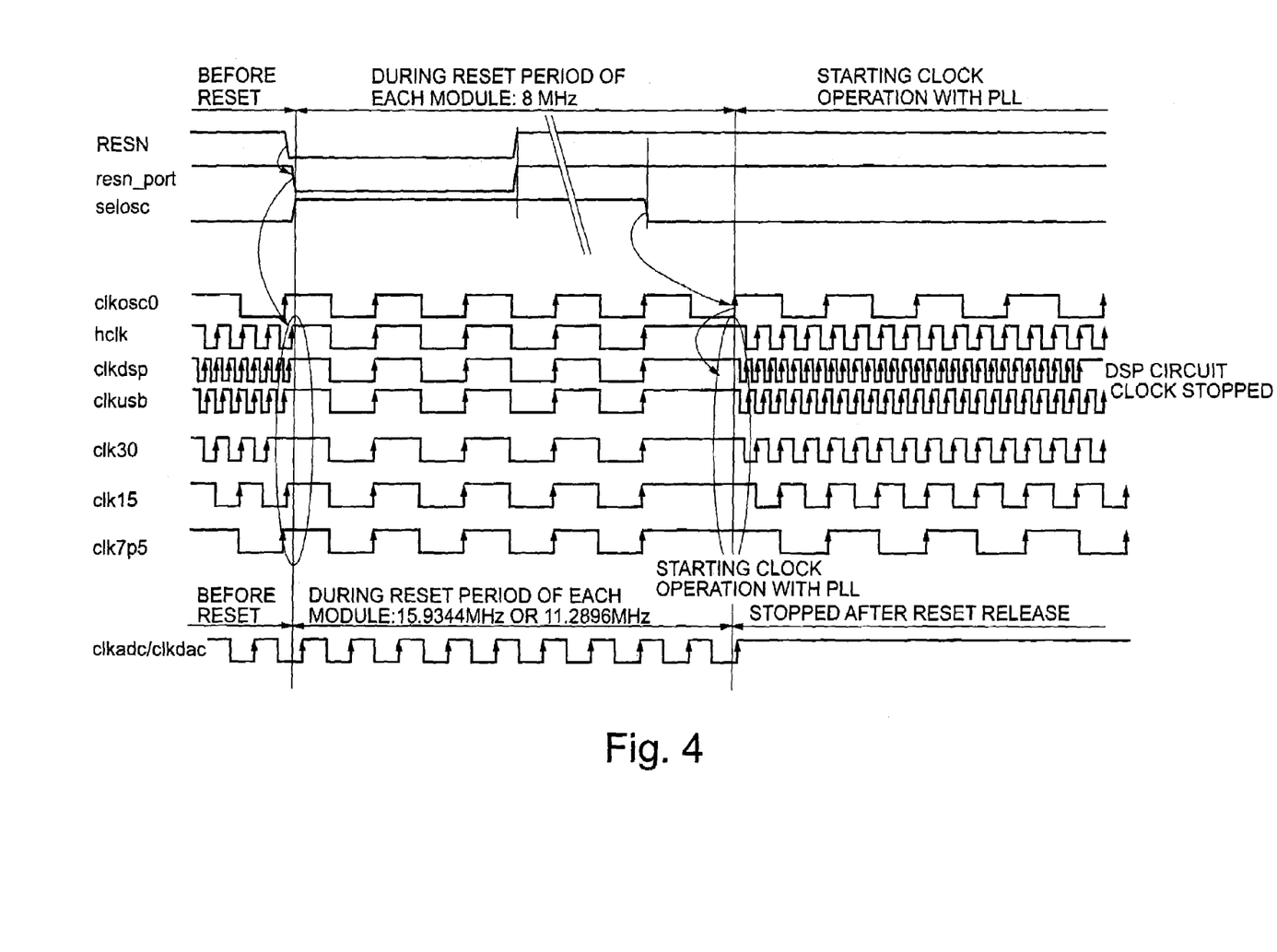
FIG. 4 is a clock operation waveform diagram at an external reset.

The OSC0 clock generation unit 1005 and the OSC2 clock generation unit 1008 are configured so as to change clock signals output in response to a clock changeover signal selosc generated by the OSC0 control circuit 2008 from an external reset signal resn in the multiplexer (2009 to 2013) portion in FIG. 2 and the multiplexer (3009 and 3010) portion in FIG. 3. Clock waveforms around an external reset is shown in FIG. 4.

During the reset, the OSC0 control circuit selects an OSC0 or OSC2 master clock for each clock (clk7p5, clk15, clk30, clkdsp, clkusb, clkadc, and clkdac in FIG. 2) according to the selosc signal generated by the external reset signal (resn). Although an input of clock signals is required to initialize the circuits inside the semiconductor device 1001 during the reset, a simultaneous supply of fast clock signals output from the PLLs to all circuits leads to current consumption in the clock operation and to a reset of the frequency divider circuits and therefore the current at initialization is restrained during the reset by using the low-frequency master clock of the OSC0 and the OSC2.

After reset release, the clock signals are changed to high-frequency clock signals from the PLLs, though the clock for the DSP circuit having a large gate size and a high clock frequency is stopped on a hardware basis to reduce the initial power after the reset release (thereafter, the clock signal can be supplied with a software control).

The semiconductor device is equipped with various facilities and the clock is branched from the output of the clock generation unit to the facilities and therefore, if there are any facilities not to be used constantly or temporarily, their clock signals can be stopped on a software basis.

Figure 5:
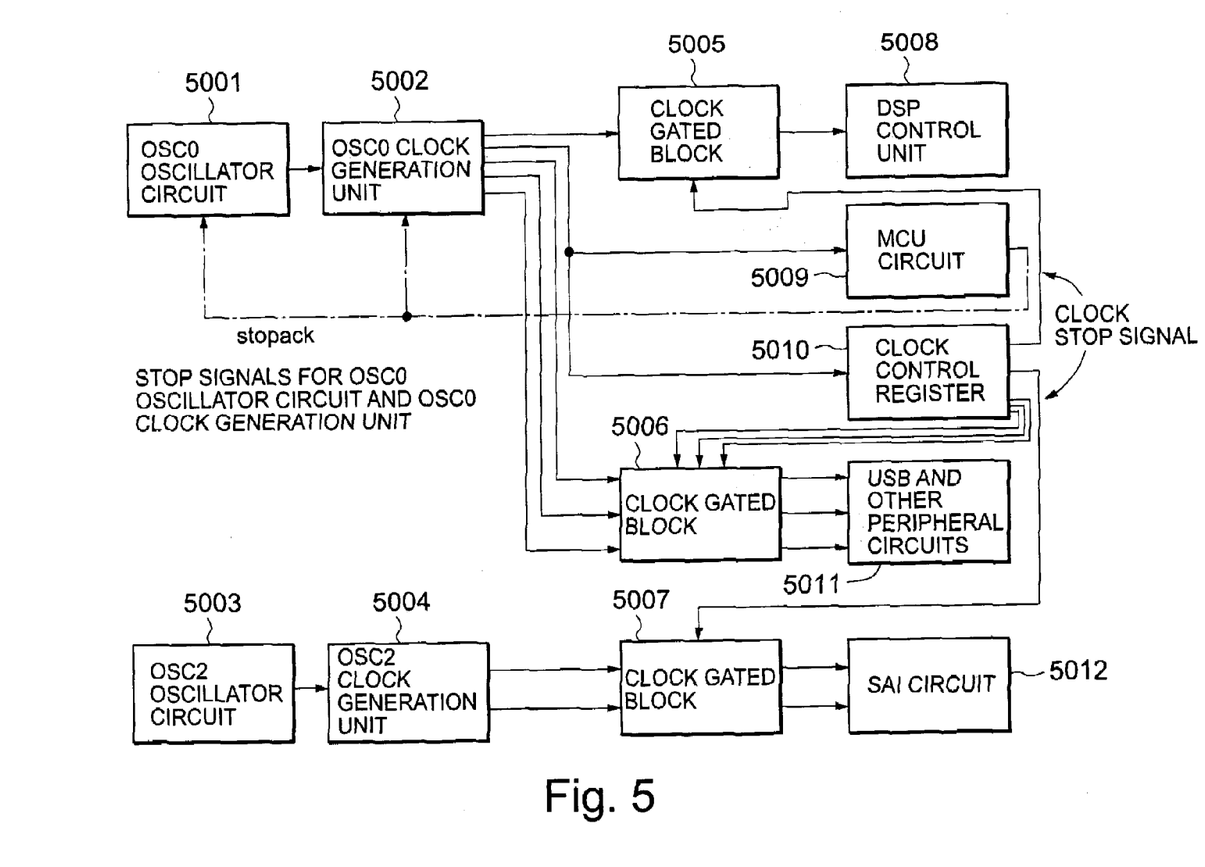
FIG. 5 is an explanatory diagram of a clock gated control.
Figure 6A:
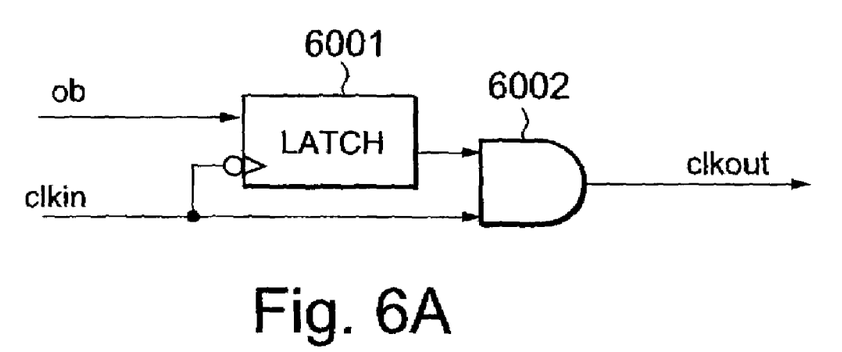
FIG. 6 is a diagram showing an example of a clock gated control circuit.
Figure 6B:
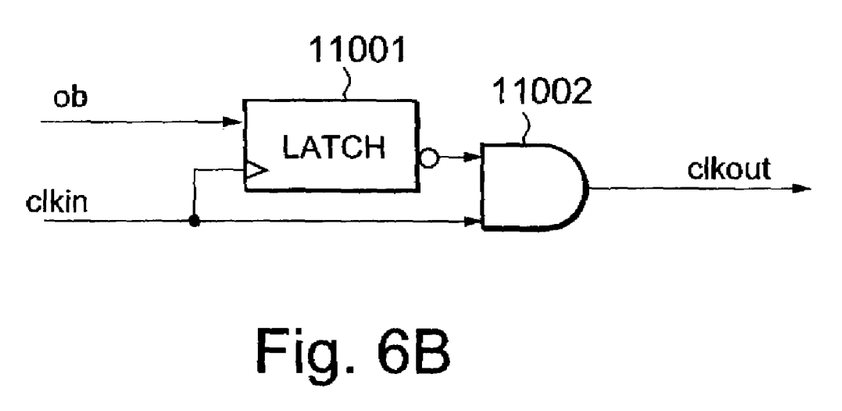

Referring to FIG. 5, there is shown a configuration of a circuit for stopping the clock signals on a software basis. An MCU circuit 5009 in FIG. 5 performs an writing operation into a clock control register 5010 to control clock gated blocks (5005 to 5007) so as to control the stop operation of the clock signals generated in the clock generation unit. Clock signals supplied to the MCU circuit 5009 and the clock control register 5010 are always operating (The clock stop controls for the MCU circuit and the clock control register will be described later). A circuit in the clock gated block comprises a latch circuit 6001 and an AND element 6002 as shown in FIG. 6(*a*). A lot of clock drivers are inserted to reduce a rise time or a fall time (clock skew) of clock waveforms or to decrease an arrival time interval (clock skew) from the clock generator circuit to each FF in the same clock between the clock gated blocks (5005 to 5007) and their circuits (5008, 5011, and 5012) for clock signals therebetween. Accordingly, clock signals that need not operate are stopped, thereby enabling a reduction of the current consumed by driving a gate of the circuit and further a reduction of the current consumed by the clock driver of the facility.

Referring to FIG. 6(*b*), there is shown another example of a circuit in the clock gated block, comprising a latch circuit and an OR element; it is useful for stopping a clock signal at a high level.

Power control modes of the semiconductor device according to the present invention are mainly classified into halt, stop, and sleep modes in addition to the normal operation mode. In the halt mode, the clock signal in the MCU stops and other clock signals operate. While data cannot be transferred inside the semiconductor device since the clock signal in the MCU stops, a single facility can operate in this mode.

In the stop mode, the clock signal in the MCU and all clock signals in the clock generation unit are stopped. Although all the clock signals in the semiconductor device are stopped, leakage current remains since the power supply of the DSP circuit is in the on-state.

In the sleep mode, the power supply of the DSP circuit is shut off in addition to the same stop control as in the stop mode. The leakage current in the DSP circuit remaining in the stop mode is shut off.

The consumed current magnitude in the respective modes is expressed as follows:
Sleep<Stop<Halt The sleep mode will be described here since the stopped circuits in the stop mode are included in those in the sleep mode among the stop and sleep modes for controlling the stop operation of the clock signals related to the present invention.

Figure 7:
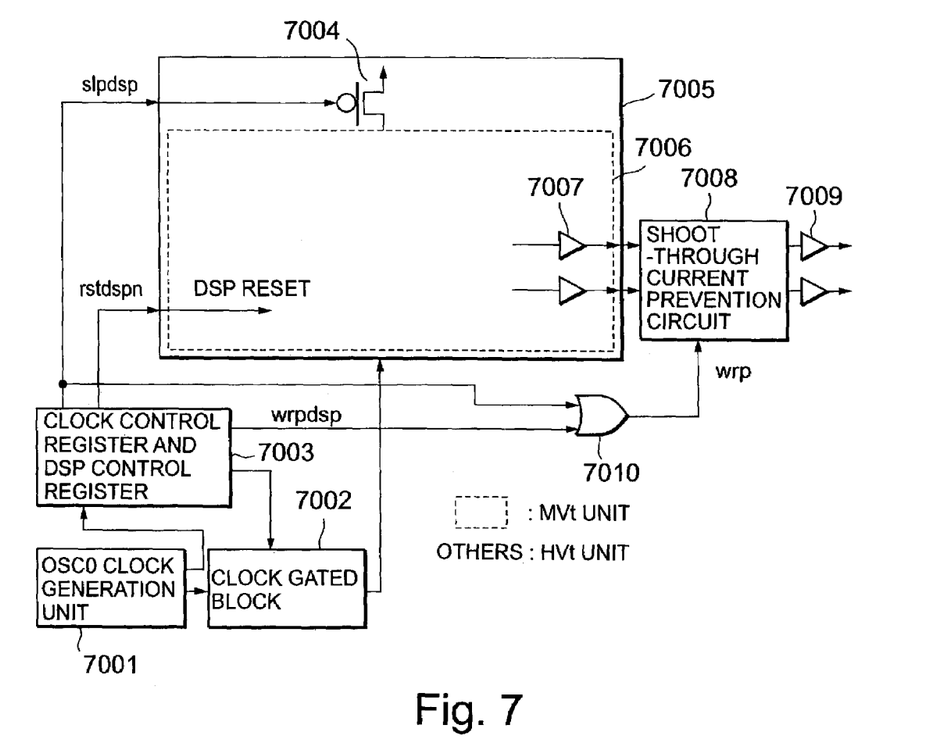
FIG. 7 is a diagram showing a configuration of a power control circuit for a DSP circuit.

For purposes of illustration of the sleep mode, a power control circuitry of the DSP circuit is shown in FIG. 7. A clock generation unit 7001 and a clock gated block 7002 as shown in FIG. 5 generate clock signals for the DSP circuit and a writing operation into a register from the MCU causes a clock control register and a DSP control register 7003 to perform a stop control of the clock signal for the DSP circuit and a DSP power down control on a software basis. A DSP circuit 7005 contains a switch element 7004 of a PMOS for the DSP power down to control the power to the DSP circuit body 7006. A transistor threshold is lowered only for the DSP circuit body 7006 to make it operate faster. The power supply of the DSP circuit body 7006 is shut off and its output signal is put in the state of an uncertain voltage level. Therefore, a shoot-through current prevention circuit 7008 is added to it.

Figure 8:
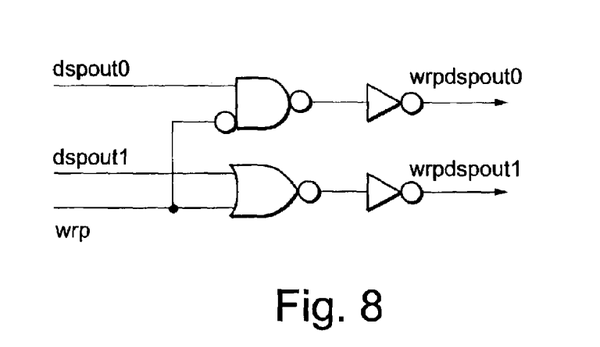
FIG. 8 is an example of a first shoot-through current prevention circuit.

Referring to FIG. 8, there is shown an example of the shoot-through current prevention circuit. Signals dspout0 and dspout1 are put in the state of an uncertain voltage level due to the power down of the DSP circuit. Therefore, wrp is preset to 1 with a register control before the power down to prevent wrpdspout0 and wrpdspout1 from being uncertain. The signal dspout0 is used for a signal required to be set to 0 at the power down of the DSP circuit and the signal dspout1 is used for a signal required to be set to 1 at the power down of the DSP.

Figure 9:
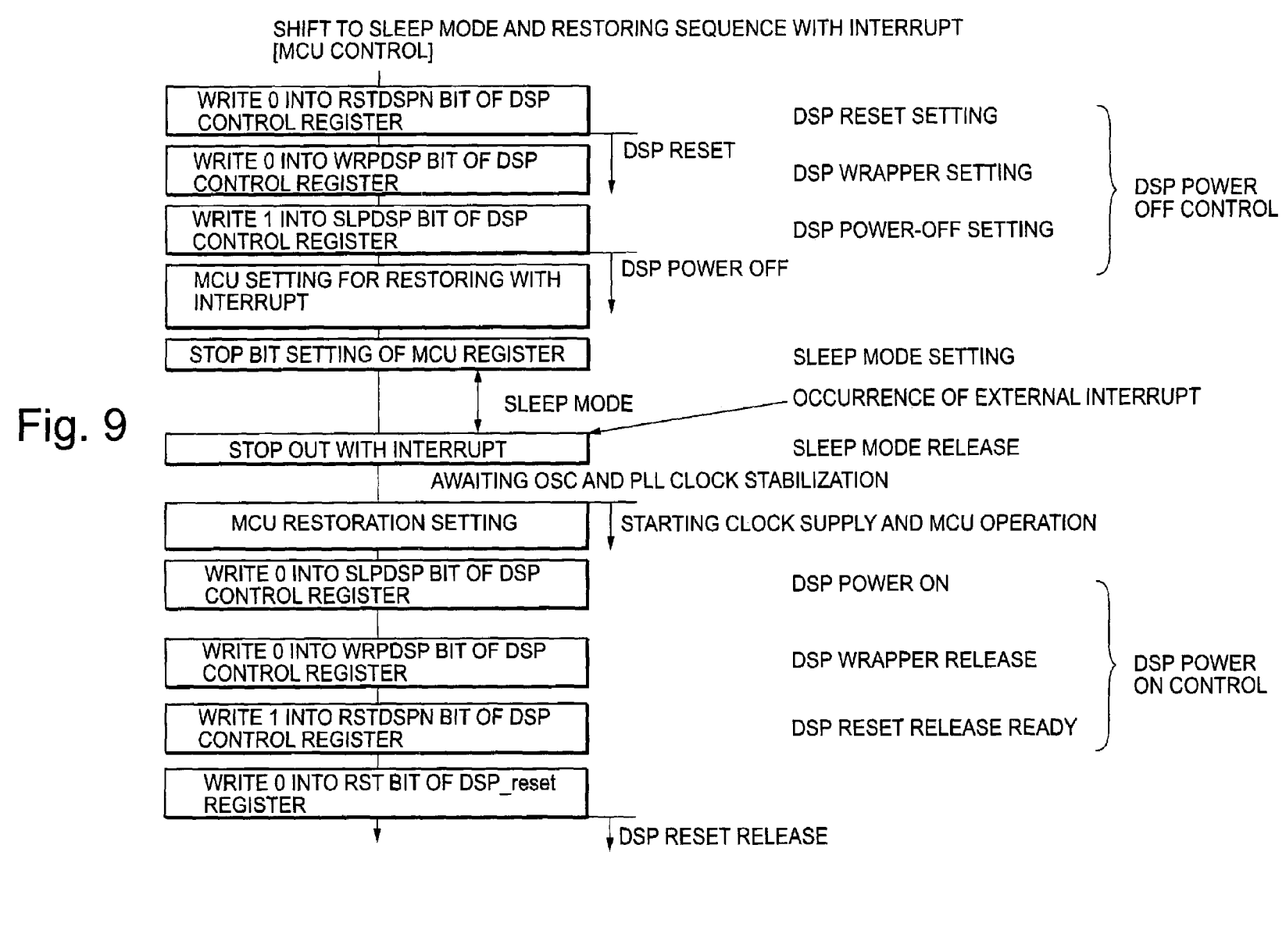
FIG. 9 is a diagram showing a procedure for a shift to the sleep mode.

Referring to FIG. 9, there is shown a procedure for a shift to the sleep mode.

First, value 0 is written into an RSTDSPN bit of the DSP control register. A rstdspn signal is set to the low level, by which the DSP circuit is put in the reset state. Subsequently, "1" is written into a WRPDSP bit of the DSP control register.

The setting of the WRPDSP bit to 1 causes a wrpdsp signal to be set to 1, thereby activating the shoot-through current prevention circuit connected to the all outputs of the DSP circuit to make settings for preventing an occurrence of shoot-through current even if some outputs of the DSP circuit are at an intermediate potential (floating). Subsequently, value 1 is written into an SLPDSP bit of the DSP control register. It sets a slpdsp signal to 1, by which the power to the DSP circuit is shut off and the low power consumption is achieved. Setting the slpdsp signal to 1 also activates the shoot-through current prevention circuit. Although unlikely in the normal specifications, it is provided to prevent the transistor from being destructed by the shoot-through current by setting the slpdsp signal to 1 instead of setting the WRPDSP bit to 1 due to a software bug during debugging the chip.

After a completion of the DSP power down, settings are made to stop the clock signals of the entire chip. Previous to it, however, there is a need for a setting for validating an external interrupt for restoring from the sleep mode. Thereafter, value 1 is written into a stop register in the MCU and a stopack signal is set to 1 (FIG. 5), by which the control enters the sleep mode to stop all clock signals.

The following describes a procedure for restoration from the sleep mode.

The restoration from the sleep mode occurs due to an external reset or an external interrupt permitted according to the setting before a shift to the sleep mode.

If the restoration occurs due to the external reset, the reset causes the settings of the RSTDSPN bit to 0 (a DSP circuit reset state), the WRPDSP bit to 0, and the SPLDSP bit to 0 (a DSP circuit power supply state) in the DSP control register, by which the semiconductor device shifts to a power supply condition.

If the restoration occurs due to the external interrupt, the MCU deasserts stopack upon receiving an external interrupt signal and the OSC0 oscillator circuit and the OSC0 clock generation unit start to operate. The OSC0 clock generation unit has a circuit in which no clock output is made until the oscillator circuit and the PLL are stabilized; clock signals are supplied to the circuits after the clock is stabilized. If the DSP circuit is used thereafter, value 0 is written into the SLPDSP bit of the DSP control register (to power on the DSP power supply) and the device waits until the power supply of the DSP circuit becomes stable using a timer. The reset is released by writing 0 to the WRPDSP bit of the DSP control register and 1 to the RSTDSPN bit thereof. Thereafter, the internal settings of the DSP are made so as to start the operation of the DSP circuit.

With the software control of the DSP power control as set forth in the above, there are advantages that it becomes possible to determine a power-on power supply stabilizing time of the DSP circuit, which is hard to estimate in a circuit design stage, on the basis of data of an actual device evaluation and that no circuit change is needed even if the power-on power supply stabilizing time changes when the control is applied to any other product.

Second Embodiment

Figure 10:
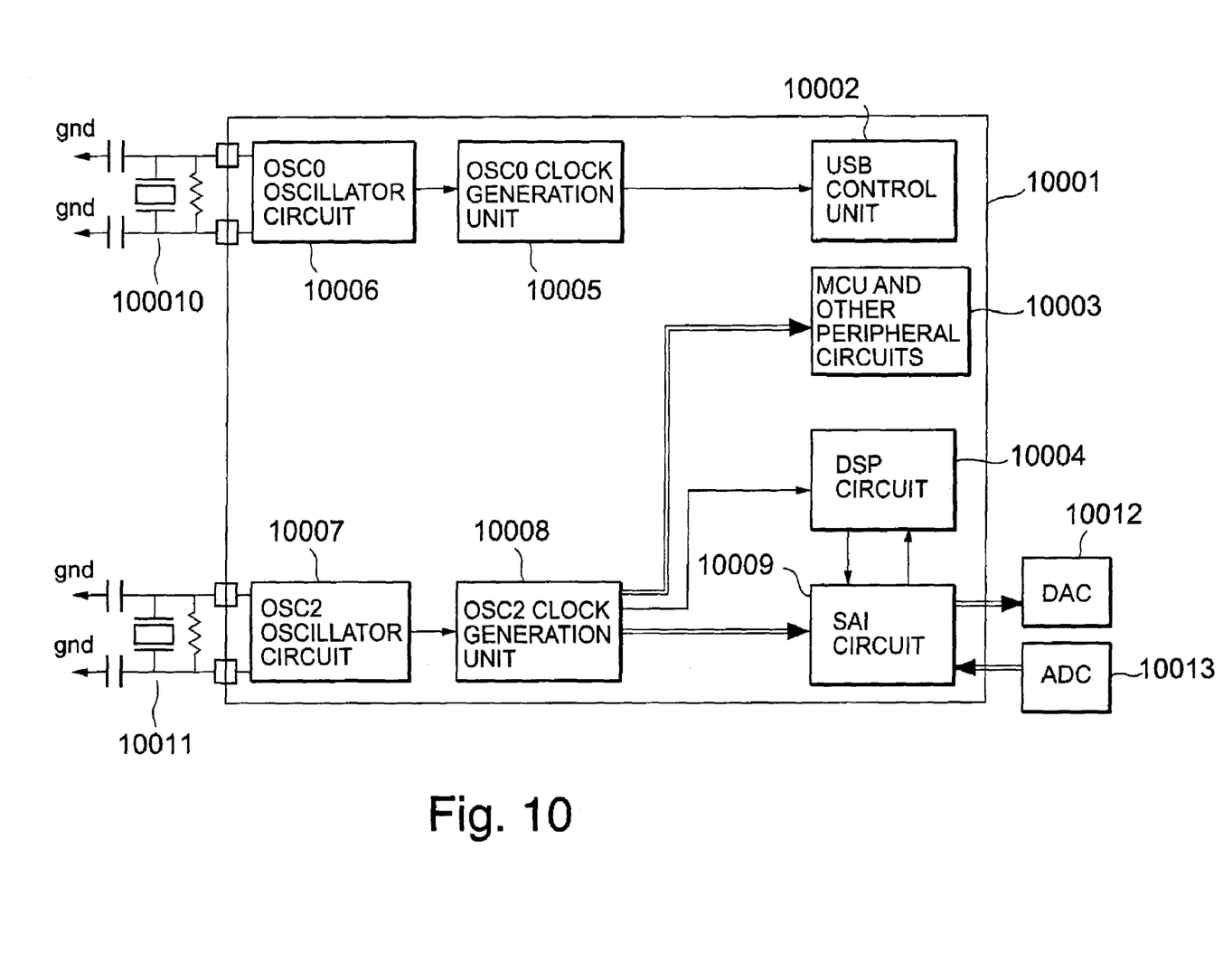
FIG. 10 is an outline view of a semiconductor device in a second embodiment of the present invention.

While an OSC0 clock generation unit 10005 generates and supplies clock signals to a USB circuit 10002, a DSP circuit 10004, and the MCU and other peripheral circuits and an OSC2 clock generation unit 10008 supplies clock signals to the SAI circuit regarding clock signals for the respective circuits in the first embodiment, there can be an arrangement in which the OSC2 clock generation unit 10008 generates and supplies clock signals to the DSP circuit 10004 and the MCU and other peripheral circuits as clock signals for the respective circuits, so that the OSC0 clock generation unit is used exclusively for the USB circuit.

Since the USB is connected to a PC to be used only for downloading or uploading, the OSC0 oscillator circuit 10006 and the OSC0 clock generation unit 10005 can be stopped when the USB is not used by separating the clock generation unit supplying clock signals to the USB from others in this manner, by which the consumed current can be significantly reduced. The case represented by the terms "when the USB is not used" corresponds to a case of reproducing music with a digital audio player disconnected to the PC.

Figure 11:
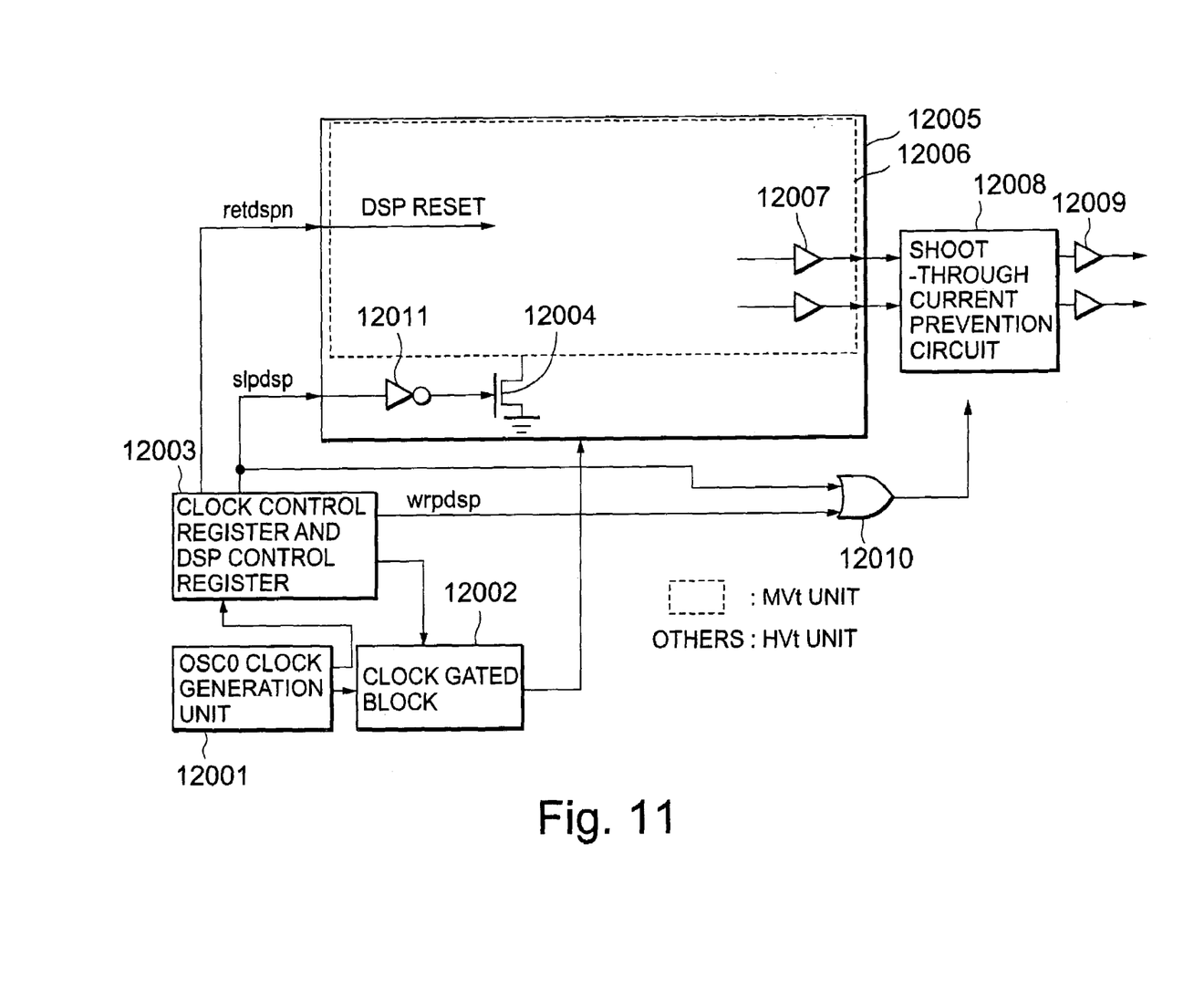
FIG. 11 is a diagram showing another sample configuration of the power control circuit for the DSP circuit.

The present invention is not limited to the above embodiments. On the contrary, various modifications are permitted based on the basis of the spirit of the present invention. For example, while the power on/off switch element 7004 in the power control circuit of the DSP circuit in FIG. 7 in the first embodiment comprises the PMOS, it can comprise an NMOS 12004 as shown in FIG. 11, which is effective to reduce the consumed current if a leakage rate of the NMOS is lower than that of the PMOS. In addition, it enables the layout pattern area to be reduced.

Figure 12:
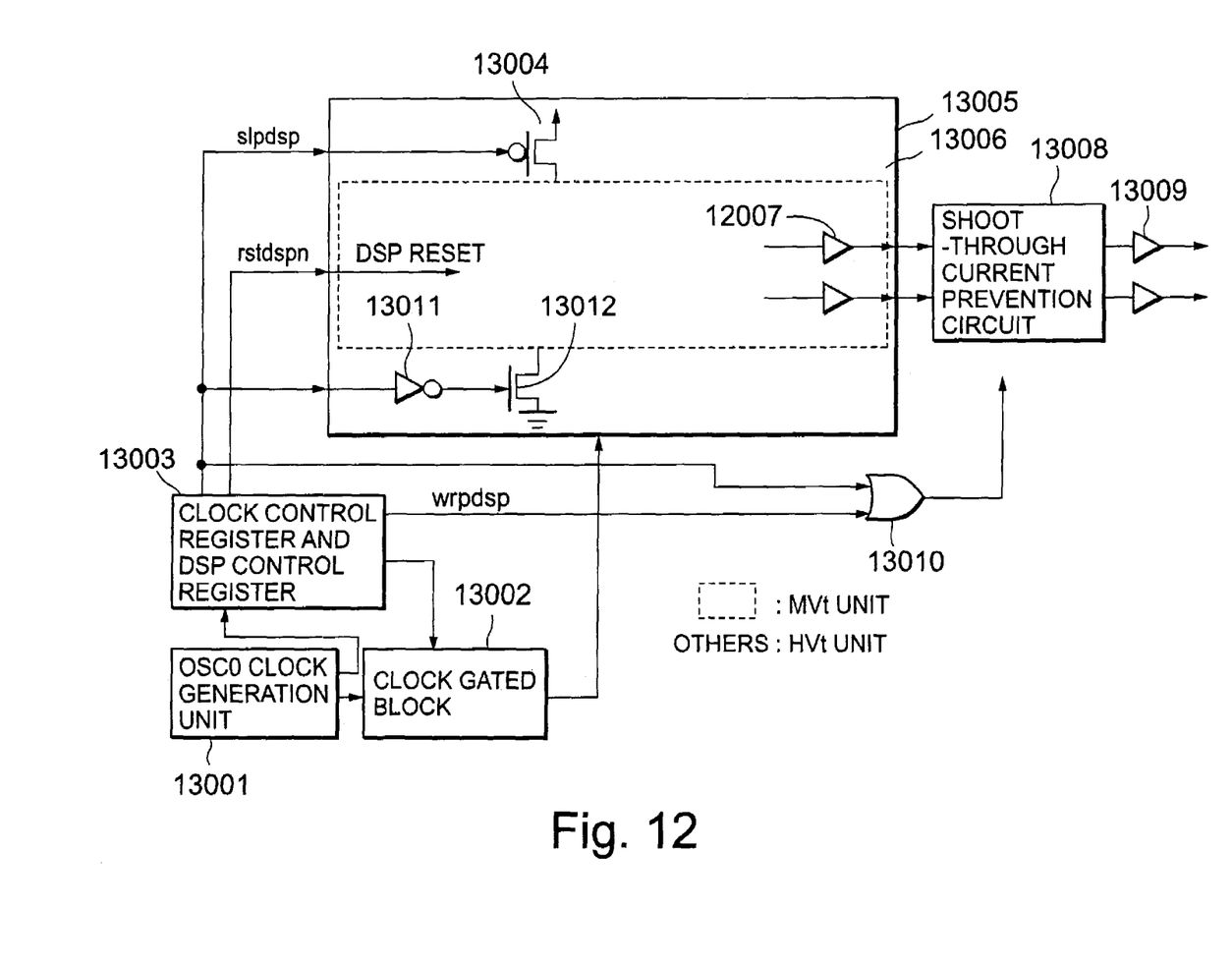
FIG. 12 is a diagram showing still another sample configuration of the power control circuit for the DSP circuit.

While the power on/off switch element 7004 in the power control circuit of the DSP circuit shown in FIG. 7 comprises only the PMOS, the switch element can comprise a PMOS 13004 in the power supply side and an NMOS 13012 in the ground side as shown in FIG. 12. While the layout area gets large in this configuration, current leakage can be reduced in comparison with the configuration where only one of the PMOS and the NMOS is used.

Figure 13:
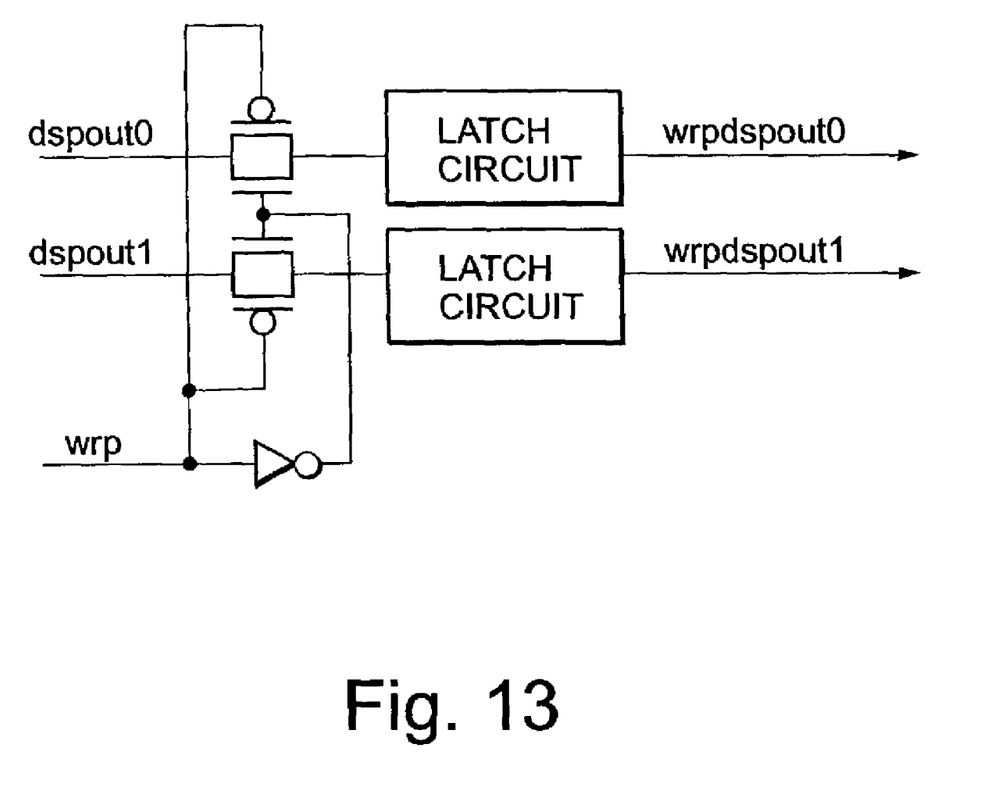
FIG. 13 is an example of a second shoot-through current prevention circuit.

Furthermore, the shoot-through current prevention circuit shown in FIG. 8 in the first embodiment can be realized by combinations of transfer gates and latch circuits as shown in FIG. 13.

As set forth in detail hereinabove, the present invention provides a semiconductor device having a plurality of data transmitter-receiver circuits using clock signals on frequencies prescribed in the unified standard as transmit/receive clock signals, wherein an oscillator circuit and a clock generator circuit are provided for each data transmitter-receiver circuit and wherein a supply of clock signals to the data transmitter-receiver circuits are stopped by shutting off the power supply to the oscillator circuits and the clock generator circuits inside the plurality of data transmitter-receiver circuits individually with respect to each data transmitter-receiver circuit, thereby enabling restraining an increase of the power consumption and therefore achieving a semiconductor device capable of reducing the power consumption of the entire semiconductor device having a lot of circuits including a digital signal processing circuit operating at a high speed.

What is claimed is:

1. A semiconductor device having a plurality of data transmitter-receiver circuits using clock signals of prescribed frequencies as transmit/receive clock signals,
   wherein an oscillator circuit and a clock generator circuit are provided for each data transmitter-receiver circuit,
   wherein a supply of clock signals to the data transmitter-receiver circuits are stopped by shutting off power supply to the oscillator circuits and the clock generator circuits inside the plurality of data transmitter-receiver circuits individually with respect to each data transmitter-receiver circuit, and
   wherein the clock generator circuits have a circuit generating a clock frequency necessary in internal circuits of the semiconductor device by multiplying and dividing clock signals input from an external clock input terminal using a PLL circuit, supply master clock signals input from the external clock input terminal to the internal circuits of the semiconductor device during external reset, and supply clock signals generated by said PLL circuit or a frequency divider circuit to each of the internal circuits of the semiconductor device after releasing the external reset.

2. A semiconductor device according to claim 1, wherein clock signals for a digital signal processing circuit are automatically stopped immediately after the clock signals for the data transmitter-receiver circuits are changed to clock signals generated from the PLL circuit and the frequency divider circuit after releasing the external reset.

3. A semiconductor device according to claim 1, wherein clock signals for the internal circuits of the semiconductor device can be stopped according to function after releasing the external reset.

4. A semiconductor device according to claim 1, wherein the semiconductor device has a power control sleep mode for shutting off a power supply of a digital signal processing circuit inside said data transmitter-receiver circuits.

5. A semiconductor device according to claim 4, wherein a shoot-through current prevention circuit is arranged in an interface circuit connected to an output of said digital signal processing circuit.

6. A semiconductor device according to claim 5, wherein said shoot-through current prevention circuit is controlled to operate simultaneously with the shut-off operation of said digital signal processing circuit.

7. A semiconductor device having a plurality of data transmitter-receiver circuits using clock signals of prescribed frequencies as transmit/receive clock signals,
   wherein an oscillator circuit and a clock generator circuit are provided for each data transmitter-receiver circuit,
   wherein a supply of clock signals to the data transmitter-receiver circuits are stopped by shutting off power supply to the oscillator circuits and the clock generator circuits inside the plurality of data transmitter-receiver circuits individually with respect to each data transmitter-receiver circuit,
   wherein the semiconductor device has a power control sleep mode for shutting off a power supply of a digital signal processing circuit inside said data transmitter-receiver circuits, and
   wherein a shoot-through current prevention circuit is arranged in an interface circuit connected to an output of said digital signal processing circuit.

8. A semiconductor device according to claim 7, wherein the clock generator circuits have a circuit generating a clock frequency necessary in internal circuits of the semiconductor device by multiplying and dividing clock signals input from an external clock input terminal using a PLL circuit, supply master clock signals input from the external clock input terminal to the internal circuits of the semiconductor device during external reset, and supply clock signals generated by said PLL circuit or a frequency divider circuit to each of the internal circuits of the semiconductor device after releasing the external reset.

9. A semiconductor device according to claim 8, wherein clock signals for the digital signal processing circuit are automatically stopped immediately after the clock signals for the data transmitter-receiver circuits are changed to clock signals generated from the PLL circuit and the frequency divider circuit after releasing the external reset.

10. A semiconductor device according to claim 8, wherein clock signals for the internal circuits of the semiconductor device can be stopped according to function after the reset release.

11. A semiconductor device according to claim 7, wherein said shoot-through current prevention circuit is controlled to operate simultaneously with the shut-off operation of said digital signal processing circuit.

12. A semiconductor device having a plurality of data transmitter-receiver circuits each operating based on corresponding ones of clock signals having predetermined frequencies respectively, the semiconductor device comprising:
   a digital processing circuit that operates based on one of the clock signals;
   clock output circuits that respectively output the clock signals to corresponding ones of said data transmitter-receiver circuits;
   a clock control circuit that controls stopping of the clock signals output by said clock output circuits to said data transmitter-receiver circuits individually; and a power supply shut-off circuit that shuts-off power supply to said digital processing circuit, wherein each of said clock output circuits comprises a selector, the selector outputs a first clock signal from an oscillator as an output of the clock output circuit, when a corresponding one of said data transmitter-receiver circuits is reset, and the selector outputs a second clock signal that is generated based on the first clock signal as the output of said clock output circuit after an end of the reset.

13. The semiconductor device according to claim 12, wherein a frequency of said first clock signal is different from a frequency of said second clock signal.

14. The semiconductor device according to claim 12, wherein said clock control circuit stops the one of the clock signals from being output to said digital processing circuit after the end of the reset.

15. The semiconductor device according to claim 12, wherein said clock control circuit stops clock signals from being output to predetermined data transmitter-receiver circuits according to functions of the transmitter-receiver circuits.

16. The semiconductor device according to claim 12, wherein said digital processing circuit is comprised of transistors each having a predetermined threshold voltage lower than a threshold of transistors of said data transmitter-receiver circuits.

17. A semiconductor device having a plurality of data transmitter-receiver circuits each operating based on corresponding ones of clock signals having predetermined frequencies respectively, the semiconductor device comprising:

a digital processing circuit that operates based on one of the clock signals;

clock output circuits that respectively output the clock signals to corresponding ones of said data transmitter-receiver circuits;

a clock control circuit that controls stopping of the clock signals outout by said clock output circuits to said data transmitter-receiver circuits individually; and a power supply shut-off circuit that shuts-off power supply to said digital processing circuit, wherein the semiconductor device further comprises an interface circuit connected to an output of said digital processing circuit, the interface circuit has a shoot-through current prevention circuit.

18. The semiconductor device according to claim 17, wherein said shoot-through current prevention circuit operates when the power supply to said digital processing circuit is shut off.

19. The semiconductor device according to claim 17, wherein said digital processing circuit is comprised of transistors each having a predetermined threshold voltage lower than a threshold of transistors of said data transmitter-receiver circuits.

20. The semiconductor device according to claim 18, wherein said digital processing circuit is comprised of transistors each having a predetermined threshold voltage lower than a threshold of transistors of said data transmitter-receiver circuits.

21. A semiconductor device having a plurality of data transmitter-receiver circuits each operating based on corresponding ones of clock signals having predetermined frequencies respectively, the semiconductor device comprising:

a digital processing circuit that operates based on one of the clock signals;

clock output circuits that respectively output the clock signals to corresponding ones of said data transmitter-receiver circuits;

a clock control circuit that controls stopping of the clock signals output by said clock output circuits to said data transmitter-receiver circuits individually; and a power supply shut-off circuit that shuts-off power supply to said digital processing circuit, wherein said clock control circuit comprises a resistor that outputs clock stopping signals, and a gate circuit that stops the clock signal from a corresponding one of said clock output circuits.

22. A semiconductor device having a plurality of data transmitter-receiver circuits each operating based on corresponding ones of clock signals having predetermined frequencies respectively, the semiconductor device comprising:

a digital processing circuit that operates based on one of the clock signals;

clock output circuits that respectively output the clock signals to corresponding ones of said data transmitter-receiver circuits;

a clock control circuit that controls stopping of the clock signals output by said clock output circuits to said data transmitter-receiver circuits individually; and a power supply shut-off circuit that shuts-off power supply to said digital processing circuit, wherein said digital processing circuit is comprised of transistors each having a predetermined threshold voltage lower than a threshold of transistors of said data transmitter-receiver circuits.

* * * * *